United States Patent
Hubbard, Sr.

[11] 3,735,493
[45] May 29, 1973

[54] HOPPLE MEASURING APPARATUS

[76] Inventor: Howard A. Hubbard, Sr., R.F.D. 1, Williston, Vt. 05495

[22] Filed: Dec. 2, 1971

[21] Appl. No.: 204,051

[52] U.S. Cl................................33/125 R, 33/143 M
[51] Int. Cl.................................................G01d 5/00
[58] Field of Search........................33/125 R, 143 M, 33/143 I, 143 J, 143 K

[56] References Cited

UNITED STATES PATENTS

| 2,044,983 | 6/1936 | Hedgpeth | 33/125 R |
| 1,262,628 | 4/1918 | Lapoiat | 33/143 M |
| 3,391,462 | 7/1968 | Craine | 33/143 M |
| 2,241,979 | 5/1941 | Case | 33/125 R |
| 2,336,594 | 12/1943 | Burkhard | 33/125 R |

Primary Examiner—Harry N. Haroian
Attorney—Charles C. Winchester

[57] ABSTRACT

Hopple measuring apparatus comprising a frame having a pair of supports vertically spaced, the upper support in a fixed position and the lower support vertically moveable between a pair of positions remote from the upper support, a weight connected to the lower support and moveable therewith, the upper portion of said weight extending to a position intermediate the upper and lower supports, and indicia beside the upper portion of the weight, indicating, by the position of the weight, the distance between the upper and lower supports.

3 Claims, 3 Drawing Figures

PATENTED MAY 29 1973    3,735,493

HOPPLE MEASURING APPARATUS

This invention relates to apparatus for measuring hopples used in harness racing.

It is a principle object of this invention to provide a simple, accurate means for measuring hopples, especially sets of hopples, according to a uniform standard. In particular it is an object to provide means for measuring hopples under a uniform tension while facilitating reading of measurements. It is a further object to provide means for stretching and removing slack from the linkage after each adjustment of the hopple, while at the same time checking the measurement thereof.

In general this invention features a frame having vertically spaced supports, with arcuate support surfaces, mounted thereon, the upper support in a fixed position and the lower support vertically moveable. The lower support is connected to the lower end of a weight moveable therewith and extending thereabove. Indicia are positioned adjacent the upper end of the weight indicating the distance between the support surfaces.

In a preferred embodiment, the frame is in the form of a tube with the weight positioned therein. The supports comprise sheaves and the lower sheave is connected to the weight through a vertical slot in the tube, the slot defining upper and lower positions, remote from the upper sheave, between which the lower sheave can be moved. A second vertical slot is provided above the first slot, the indicia positioned therebeside. The weight has a length greater than that of the first slot and less than the distance between the upper end of the first slot and the upper sheave. The second slot has a length at least as great as that of the first slot and has its lower end adjacent the upper end of the weight, with the lower sheave in its lowermost position. An indicator extends from the upper end of the weight, through the upperslot, adjacent the indicia for indicating the distance between the remote surfaces of the two sheaves.

Other objects, features and advantages of this invention will be apparent to those skilled in the art from the following detailed description of a preferred embodiment thereof, taken together with the accompanying drawings in which.

Figure 1:
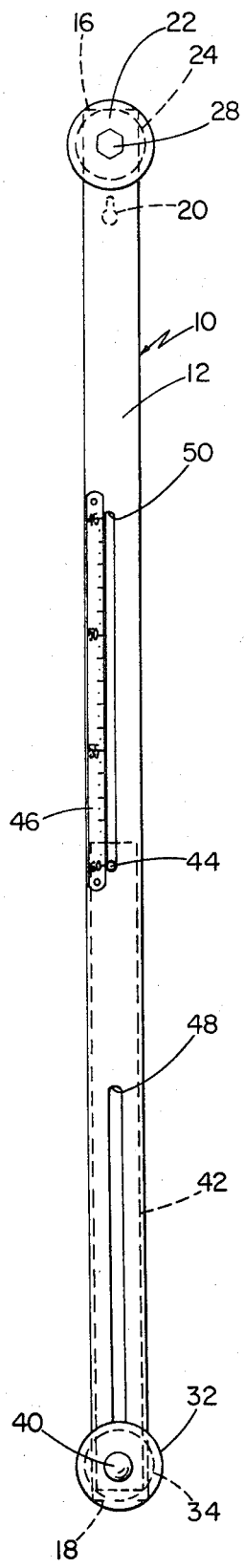
FIG. 1 is a front elevation of apparatus embodying the invention.
Figure 2:
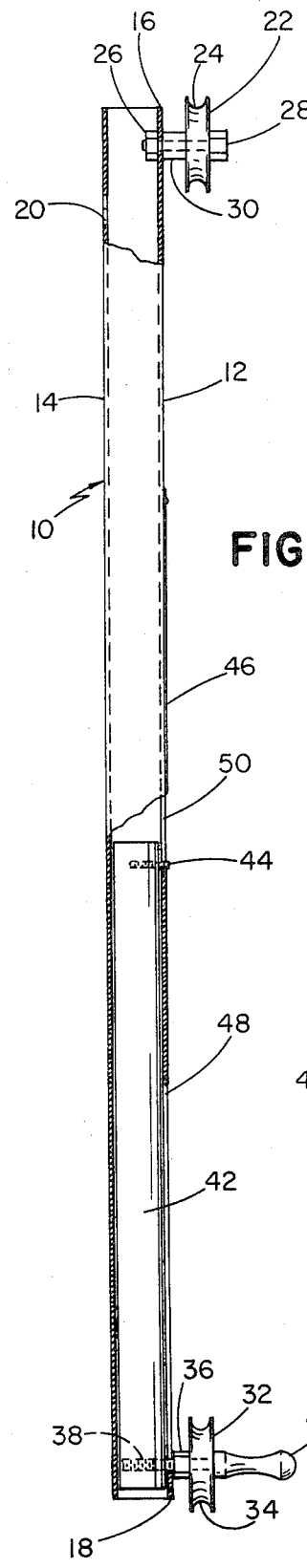
FIG. 2 is a side elevation, with portions partially broken away, of the apparatus shown in FIG. 1.
Figure 3:
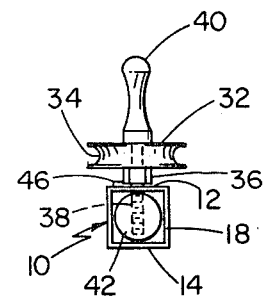
FIG. 3 is a view looking upward from the bottom of the apparatus shown in FIGS. 1 and 2.

As shown in the drawings, the apparatus includes an elongated vertical frame 10 comprising a square tube as shown in FIG. 3. A keyhole slot 20 is provided in the rear wall 14 of tube 10, adjacent its upper end 16, as shown in FIGS. 1 and 2, to facilitate wall mounting. In a preferred embodiment, tube 10 is 60 inches long.

A first support 22, comprising a sheave, is fixedly connected to the upper end 16 of tube 10 on the front wall 12 thereof. Groove 24 in sheave 22 provides an upwardly facing arcuate support surface and, in a preferred embodiment, is tangent with the upper end 16 of tube 10. Sheave 22 is connected to tube 10 by nut 26 within tube 10, and bolt 28, extending through sheave 22 and front wall 12 into threaded engagement with nut 26. A spacing collar 30, about bolt 28 and between wall 12 and sheave 22, spaces the sheave 22 away from the front wall 12 of tube 10.

A second support 32, also comprising a sheave, is vertically moveably provided adjacent the lower end 18 of tube 10 on the front wall 12 thereof. Groove 34 in sheave 32 provides a downwardly facing arcuate support surface and, in a preferred embodiment, is tangent with the lower end 18 of tube 10 when sheave 32 is in its lowermost position.

A first vertical slot 48 is provided in the front wall 12 of tube 10 adjacent the lower end 18 thereof and vertical aligned with bolt 28 adjacent upper end 16. Slidably positioned within tube 10, adjacent lower end 18, is a weight 42 comprising a vertically positioned elongated steel cylinder, preferably weighing 30 pounds, having a length greater than that of slot 48 and less than the distance between the upper end of slot 48 and the most adjacent portion of sheave 22, preferably about one half the length of tube 10. A second vertical slot 50, equal in length to slot 48 and spaced thereabove, is provided in the front wall of tube 10 intermediate slot 48 and sheave 22. The lower end of slot 50 is spaced from the lower end of slot 48 by a distance less than the length of weight 42.

Sheave 32 is fixedly connected to weight 42 adjacent its lower end by a threaded rod 30 extending through sheave 32 and first slot 48 into threaded engagement with weight 42. Sheave 32 is spaced from front wall 12 of tube 10 in alignment with sheave 22 by a nut 36 on rod 38 between wall 12 and sheave 32 and by a handle 40 in threaded engagement with the end of rod 38 on the side of sheave 32 opposite nut 36. Sheave 32 is thus vertically slidably connected to tube 10 and is moveable between a pair of positions remote from sheave 22 defined by the upper and lower ends of first slot 48, the lower end of slot 48 being spaced above the lower end 18 of tube 10 a distance equal to that between adjacent surfaces of rod 38 and groove 34 in sheave 32.

An indicator 44, mounted in threaded engagement with weight 42 a distance from rod 38 equal to the distance between the lower ends of slots 48, 50, extends through second slot 50. Measuring indicia is vertically positioned beside slot 50 extending a distance equal to the length of first slot 48. The lowermost of the indicia, adjacent the lower end of slot 50 and the upper end of weight 42, with sheave 32 and indicator 44 in their lowermost positions, indicates the maximum distance between grooves 24, 34. The other indicia indicates the distance between the upper and lower portions of grooves 24, 34 with sheave 32 and indicator 44 above their lowermost positions. Preferably slots 48, 50 and indicia 46 have a length of about 15 inches to permit a range of measurements of the distances between grooves 24, 34 between 45–60 inches.

In operation, a hopple is first draped over sheave 22 in groove 24 thereof. Sheave 32 is lifted by handle 40 and the other end of the hopple is placed in groove 34. Handle 40 is then lowered and released allowing weight 42 to stretch the hopple. A reading of the length of the hopple may be made by viewing the position of indicator 44 beside indicia 46. To match a pair of hopples, the procedure is then repeated with a second hopple. If adjustment is required, the hopple is removed from the lower sheave 32 and the linkage of the hopple adjusted. The measuring procedure is then repeated to check the adjusted length and to remove slack from the linkage. The pressure imposed by the weight 42 serves to stretch and remove slack from the hopple for accurate measurement according to a uniform, predetermined standard and also serves to shape the hopple.

Other embodiments of this invention will occur to those skilled in the art which are within the scope of the following claims.

What is claimed is:
1. In hopple measuring apparatus, comprising:
a frame;
a first support fixedly connected to one side of said frame and having an upwardly facing arcuate support surface; and
a second support vertically moveably connected to said one side of said frame vertically below said first support and having a downwardly facing arcuate support surface, said second support vertically moveable between a pair of positions remote from said first support;
the improvement comprising:
a first vertical slot provided in said frame adjacent said second support and defining said pair of positions;
a vertically positioned elongated weight fixedly connected adjacent its lower end through said first slot to said second support for vertical movement therewith and having its upper end adjacent said frame and positioned intermediate said first and second supports, said weight having a length greater than that of said first slot and less than the distance between the upper end of said first slot and the most adjacent portion of said first support;
a second vertical slot provided in said frame adjacent the upper end of said weight, vertically spaced above said first slot, having a length at least as great as said first slot and having its lower end adjacent the upper end of said weight with said second support in its lowermost position;
vertically positioned measuring indicia positioned on said frame beside said second slot intermediate said first and second supports, said indicia extending and measuring a distance equal to the distance between said pair of positions, the lowermost of said indicia positioned adjacent the upper end of said weight with said second support in its lowermost position and indicating thereat the maximum distance between said support surfaces; and
an indicator connected to said weight adjacent the upper end thereof and extending through said second slot adjacent the lower end thereof and of said indicia with said second support in its lowermost position.

2. The apparatus claimed in claim 1 in which said first and second supports each comprise a sheave.

3. The apparatus claimed in claim 1 in which said frame comprises a tube and said weight is slidably positioned therewithin.

* * * * *